US012523338B2

(12) United States Patent
Lu

(10) Patent No.: US 12,523,338 B2
(45) Date of Patent: Jan. 13, 2026

(54) DYNAMIC BALANCE ADJUSTING STRUCTURE USED FOR TRIPOD HEAD

(71) Applicant: Ningbo Weifeng Intelligent Technology Co., Ltd., Zhejiang (CN)

(72) Inventor: Qi Lu, Ningbo (CN)

(73) Assignee: Ningbo Weifeng Intelligent Technology Co., Ltd., Ningbo (CN)

( * ) Notice: Subject to any disclaimer, the term of this patent is extended or adjusted under 35 U.S.C. 154(b) by 3 days.

(21) Appl. No.: 18/661,822

(22) Filed: May 13, 2024

(65) Prior Publication Data
US 2025/0251080 A1 Aug. 7, 2025

(30) Foreign Application Priority Data
Feb. 4, 2024 (CN) .......................... 202420272700.5

(51) Int. Cl.
*F16M 11/18* (2006.01)
*G03B 17/56* (2021.01)

(52) U.S. Cl.
CPC ........... *F16M 11/18* (2013.01); *G03B 17/561* (2013.01); *F16M 2200/047* (2013.01)

(58) Field of Classification Search
CPC .. F16M 11/18; F16M 2200/047; F16M 11/10; F16M 11/2021; F16M 11/126; F16M 11/2064; G03B 17/561
USPC ................ 248/178.1; 296/421, 428
See application file for complete search history.

(56) References Cited

U.S. PATENT DOCUMENTS

| | | | | |
|---|---|---|---|---|
| 1,898,469 A | * | 2/1933 | Tonsor ................... | F16M 11/10 248/183.3 |
| 2,719,690 A | * | 10/1955 | Zucker ................... | F16M 11/10 188/68 |
| 4,955,568 A | * | 9/1990 | O'Connor .............. | F16M 11/10 248/183.3 |
| 5,389,972 A | * | 2/1995 | Cartoni .................. | F16M 11/10 396/428 |

(Continued)

*Primary Examiner* — Christopher Garft
(74) *Attorney, Agent, or Firm* — Wang Law Firm, Inc.

(57) ABSTRACT

A dynamic balance adjusting structure used for a tripod head is provided. The dynamic balance adjusting structure includes a main body arranged on a tripod head. One side of the main body is provided with a rotatable side cover, and the outer side of the side cover is provided with a rotatable knob. The main body is internally provided with an inner torsion spring seat, a first torsion spring and a second torsion spring are arranged between the inner torsion spring seat and the side cover, and inner ends of the first torsion spring and the second torsion spring are fixed on the inner torsion spring seat. The inner side of the side cover is provided with a first outer torsion spring seat and a second outer torsion spring seat which are rotatable, an outer end of the first torsion spring is fixed on the first outer torsion spring seat, and an outer end of the second torsion spring is fixed on the second outer torsion spring seat. The side cover is provided with a first substrate component and a second substrate component. According to the provided dynamic balance adjusting structure used for a tripod head, through the unique structure with double torsion springs, the gear can be selected, multi-gear balance force can be provided to achieve a better dynamic balance effect, and the operation is convenient.

10 Claims, 6 Drawing Sheets

(56) References Cited

U.S. PATENT DOCUMENTS 5,413,295 A * 5/1995 Ishikawa ................ F16M 13/00
                    396/428
2008/0258022 A1* 10/2008 Jaumann ................ F16M 11/10
                    248/183.4

* cited by examiner

DYNAMIC BALANCE ADJUSTING STRUCTURE USED FOR TRIPOD HEAD

TECHNICAL FIELD

The present disclosure belongs to the technical field of tripod heads, in particular to a dynamic balance adjusting structure used for a tripod head.

BACKGROUND

The tripod head, as a commonly used structure used on the support, is used for keep cameras, mobile phones, video cameras and other equipment stable, and can rotate in multiple directions. At present, the conventional tripod head structure in the prior art has a dimension that can rotate in the vertical direction, and the rotation axis is in the horizontal direction.

After the photographic device is installed on the assembly panel, the angle is horizontal, the assembly panel is in a horizontal state, and the force is uniform. When the angle is tilted, the center of gravity of the photographic device deviates. Under the action of gravity, the rotating structure continues to rotate downward. At this time, if the locking structure fails, the photographic device can rotate and fall, or even fall to the ground, so that the loss is great. Therefore, in view of this situation, a torsion spring structure is installed in the tripod head, and the torsion spring can generate reverse elastic force during the rotation process to counteract or neutralize the offset gravity. Further design and research have been made in this direction in this application.

SUMMARY

Aiming at the disadvantages in the prior art, the present disclosure provides a dynamic balance adjusting structure used for a tripod head. Through the unique structure with double torsion springs, the gear can be selected, multi-gear balance force can be provided to achieve a better dynamic balance effect, and the operation is convenient.

The present disclosure is solved through the following technical scheme.

A dynamic balance adjusting structure used for a tripod head includes a main body arranged on a tripod head. One side of the main body is provided with a rotatable side cover, and the outer side of the side cover is provided with a rotatable knob. The main body is internally provided with an inner torsion spring seat, a first torsion spring and a second torsion spring are arranged between the inner torsion spring seat and the side cover, and inner ends of the first torsion spring and the second torsion spring are fixed on the inner torsion spring seat. The inner side of the side cover is provided with a first outer torsion spring seat and a second outer torsion spring seat which are rotatable, an outer end of the first torsion spring is fixed on the first outer torsion spring seat, and an outer end of the second torsion spring is fixed on the second outer torsion spring seat. The side cover is provided with a first substrate component and a second substrate component. The first substrate component is provided with a first locating piece for locating the first outer torsion spring seat. The second substrate component is provided with a second locating piece for locating the second outer torsion spring seat. The first outer torsion spring seat and the second outer torsion spring seat synchronously rotate along with the side cover when the first outer torsion spring seat and the second outer torsion spring seat are located. The knob is provided with an executive part. When the knob rotates, the executive part can drive the first locating piece and/or the second locating piece to move and release the location, so that the first outer torsion spring seat and/or the second outer torsion spring seat can be reset under the elastic force of the corresponding torsion spring.

In the initial state of the tripod head in this application, the panel faces upwards, the side cover is straightened. At this time, the first torsion spring and the second torsion spring are also in the initial state and are not stressed. During the use, a photographic device is installed on the panel, and the panel is rotated to communicate with the side cover, so that the tilt angle can be adjusted. During the rotation, the two torsion springs are stressed to generate elastic force to counteract the gravity of the photographic device in an inclined state, so that dynamic balance can be achieved. In this application, the downward gravity generated by different use states and different photographic devices is different, thus in this application, two torsion springs with adjustable gears are adopted. Specifically, in the use process, the knob can be rotated in an inclined state. During the rotation process of the knob, the executive part on the knob can drive a locating piece to move, so that the first substrate component or the second substrate component releases the location of the corresponding outer torsion spring seat. At this time, the corresponding outer torsion spring seat can freely rotate and return to the initial state under the elastic force of the corresponding torsion spring. At this time, only the other torsion spring generates elastic force, and relatively small elastic force can be provided to adapt to the use conditions, so that the purpose of dynamic balance adjustment is achieved. In this state, if the knob is rotated continuously, the other locating piece can be moved to release the location of the other outer torsion spring seat. At this time, both torsion springs are not stressed, and the panel can be flexibly rotated to the initial position for resetting. When resetting, the first locating piece and the second locating piece are re-inserted into the corresponding outer torsion spring seats for location to get ready for the next adjustment.

In an optimized embodiment, the first locating piece is a locating pin arranged in the first substrate component, the locating pin abuts against a first spring in the first substrate component, and the first spring is used for providing elastic force. A first deflector rod extends from the first locating piece, and the executive part can move the first deflector rod to move the first locating piece to release the location of the first outer torsion spring seat.

In an optimized embodiment, the second locating piece is a locating pin arranged in the second substrate component, the locating pin abuts against a second spring in the second substrate component, and the second spring is used for providing elastic force. A second deflector rod extends from the second locating piece, and the executive part can move the second deflector rod to move the second locating piece to release the location of the second outer torsion spring seat.

In an optimized embodiment, the executive parts are a first protruding part and a second protruding part which are arranged on the inner side of the knob. During the rotation of the knob, the first protruding part can guide the first deflector rod to move and the first locating piece can release the location of the first outer torsion spring seat, and the second protruding part can guide the second deflector rod to move and the second locating piece can release the location of the second outer torsion spring seat. The structure is simple, and the operation is convenient.

In an optimized embodiment, a locating hole is formed in the first outer torsion spring seat, and the first locating piece is inserted into the first locating hole for realizing location.

A second locating hole is formed in the second outer torsion spring seat, and the second locating piece is inserted into the second locating piece for realizing location. The structure is compact, and is convenient to locate and unlock.

In an optimized embodiment, a first strip-shaped hole for the first deflector rod to pass through and a second strip-shaped hole for the second deflector rod to pass through are formed in the side cover to play limiting and guiding roles without influencing the movement of the deflector rod during locating and unlocking.

In an optimized embodiment, one side, facing the knob, of the side cover is provided with a protruding structure. A limiting groove is formed in the protruding structure. The inner side of the knob is provided with a limiting column. The limiting column is placed in the limiting groove for limiting movement, and the rotation angle of the knob is also limited, so that excessive rotation is avoided.

In an optimized embodiment, one side, facing the knob, of the side cover is provided with a protruding structure. A gear hole is also formed in the protruding structure. The inner side of the knob is provided with a gear ball. The gear ball is placed in the gear hole for realizing gear feedback. In the structure, the number of the gear holes can be three. During the rotation of the knob, the gear ball can be separated from one gear hole after the gear ball is stressed and moves into another gear hole to provide gear shifting feedback, and the hand feeling is good.

In an optimized embodiment, when the tripod head is at the initial position, the first substrate component and the second substrate component are located at the upper end and the lower end of the side cover. The first protruding part and the second protruding part on the inner side of the knob are arranged at asymmetric positions on the circumference. Therefore, during the rotation, the first outer torsion spring seat and the second outer torsion spring seat can be unlocked in sequence to realize gear adjustment on the elastic force, so that dynamic balance adjustment is realized.

In an optimized embodiment, the center of the inner torsion spring seat is provided with a central column towards the direction of the side cover. The second outer torsion spring seat sleeves the central column and rotates. The first outer torsion spring seat sleeves an outer ring of the second outer torsion spring seat and can rotate. The whole assembly structure is compact and stable.

Compared with the prior art, the present disclosure has the following beneficial effects. A dynamic balance adjusting structure used for a tripod head is provided. Through the unique structure with double torsion springs, the gear can be selected, multi-gear balance force can be provided to achieve a better dynamic balance effect, and the operation is convenient.

DETAILED DESCRIPTION OF THE EMBODIMENTS

Figure 1:
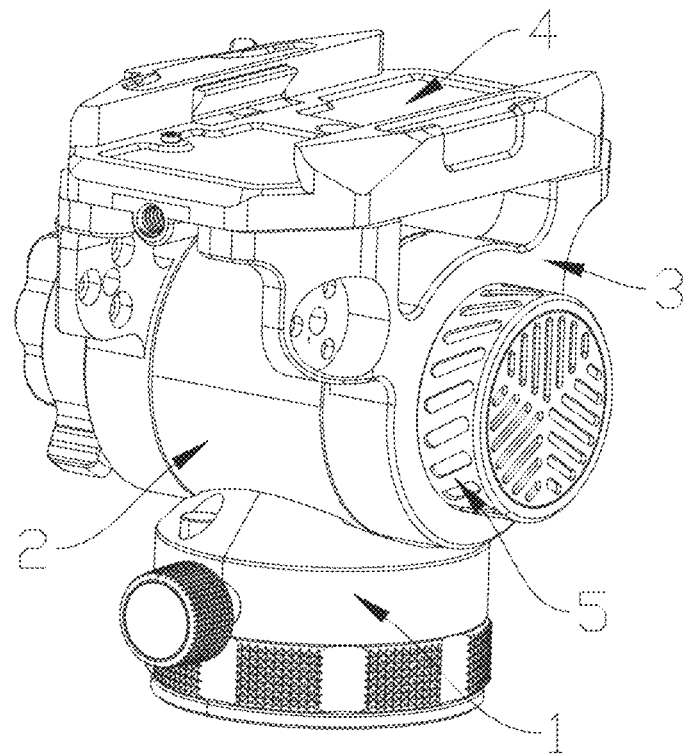
FIG. 1 is a space diagram of a tripod head in this application.
Figure 2:
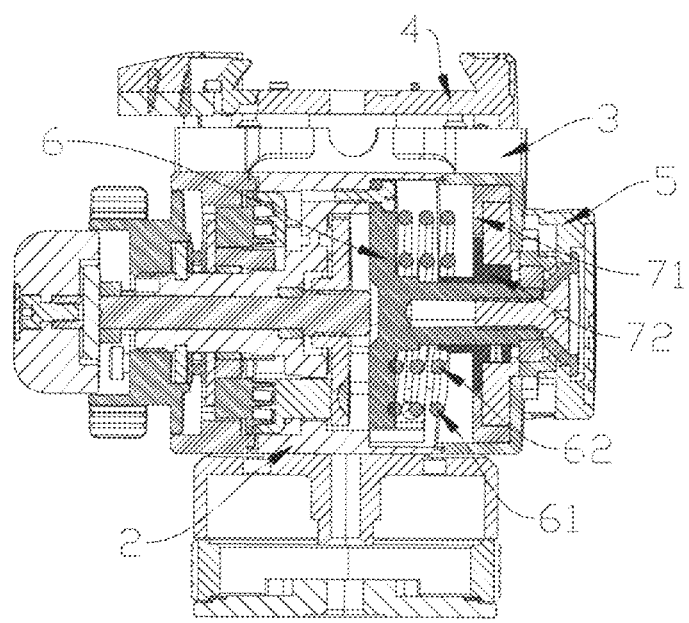
FIG. 2 is a section view of a tripod head in this application.
Figure 3:
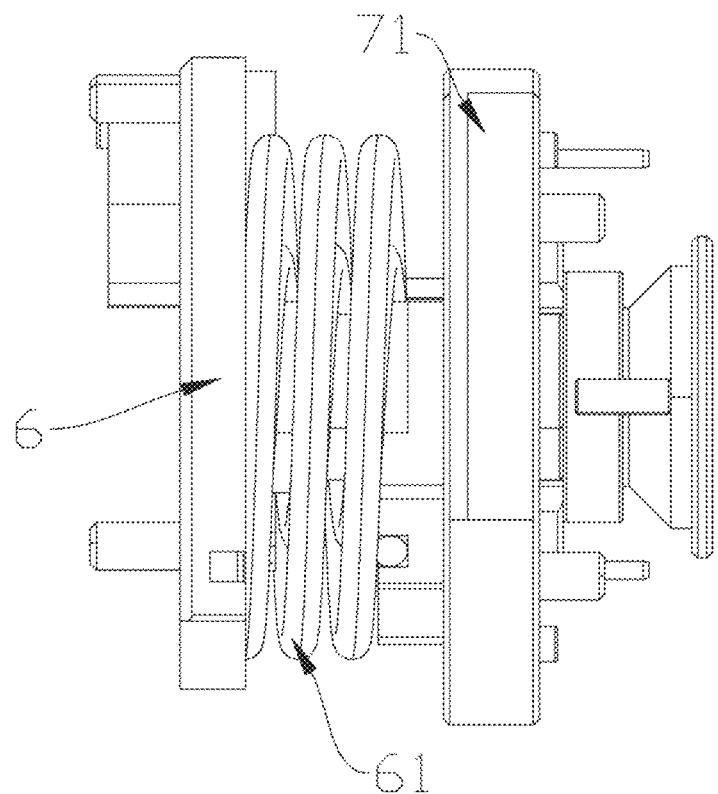
FIG. 3 is a structural schematic diagram of a torsion spring and a torsion spring seat in a tripod head in this application.
Figure 4:
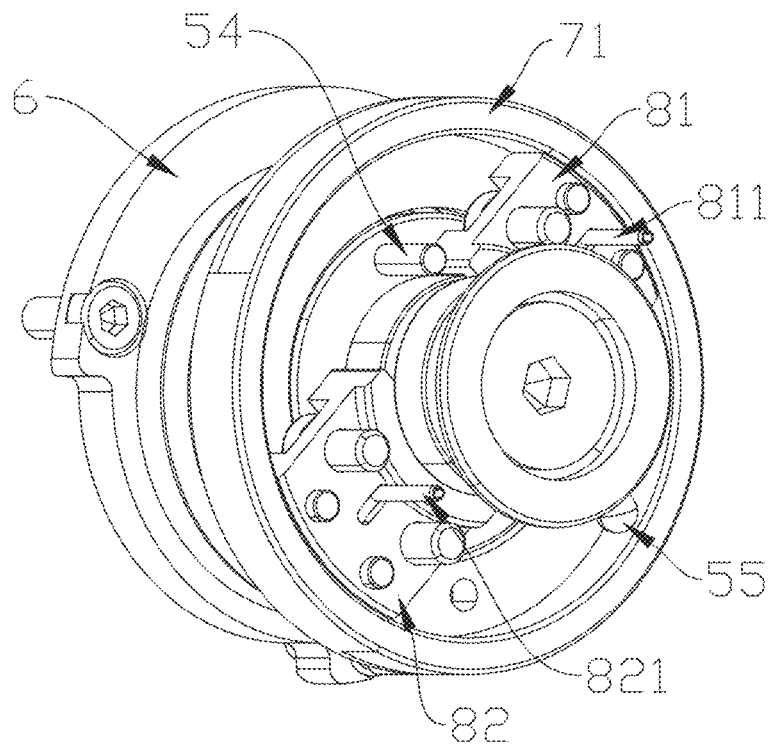
FIG. 4 is a structural space diagram of a torsion spring and a torsion spring seat in a tripod head in this application.
Figure 5:
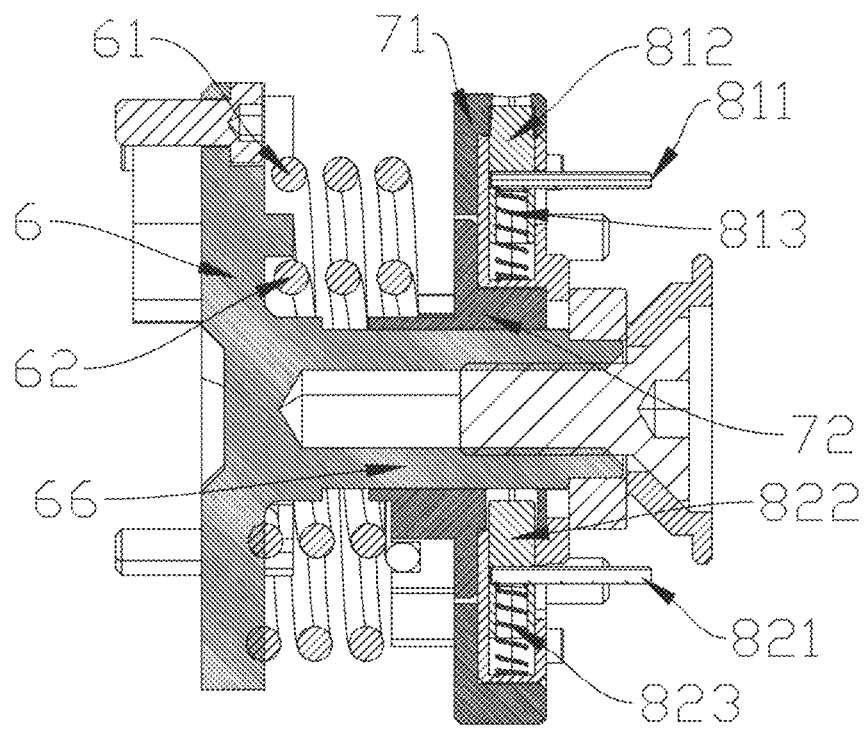
FIG. 5 is a structural section view of a torsion spring and a torsion spring seat in a tripod head in this application.
Figure 6:
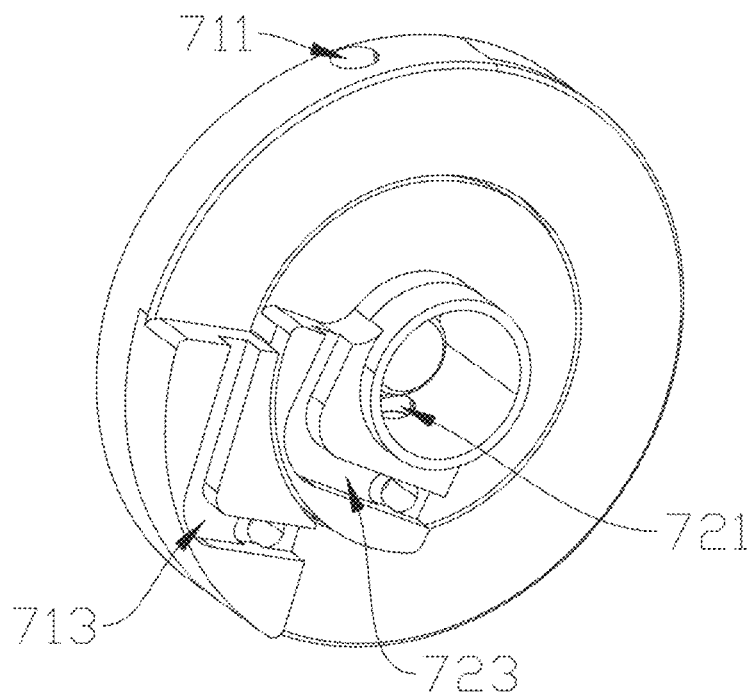
FIG. 6 is a space diagram of a first outer torsion spring seat and a second outer torsion spring seat in a tripod head in this application.

The present disclosure is further described in detail in conjunction with the attached figures and embodiments.

In the following embodiments, the same or similar reference mark numbers indicate the same or similar elements or elements with the same or similar functions. The embodiments described below by reference to the attached figures are exemplary only for explaining the present disclosure and are not to be construed as limiting the present disclosure.

In the description of the present disclosure, it needs to be illustrated that the indicative direction or position relations of the terms such as "center", "longitudinal", "transverse", "length", "width", "thickness", "upper", "lower", "front", "rear", "left", "right", "vertical", "horizontal", "top", "bottom", "inside", "outside", "clockwise" and "counterclockwise" are direction or position relations illustrated based on the attached figures, just for facilitating the description of the present disclosure and simplifying the description, and the terms cannot be understood as the restriction of the present disclosure. In addition, the terms "first" and "second" are merely intended for a purpose of description, and shall not be understood as an indication or implication of relative importance or implicit indication of the number of indicated technical features. In the description of the present disclosure, it needs to be illustrated that, except as otherwise noted, the terms such as "install", "link" and "connect" should be generally understood. For those skilled in the art, the specific meanings of the terms in the present disclosure can be understood according to specific conditions.

referring to FIG. 1 to FIG. 11, the present disclosure relates to a tripod head. The tripod head includes a base 1. The base 1 is provided with a main body 2. Both sides of the main body 2 are provided with side covers 3. The upper part of the side cover 3 is provided with a panel 4 for installing a photographic device. In the tripod head, a dynamic balance adjusting structure is provided. The dynamic balance adjusting structure includes a main body 2 arranged on a tripod head. One side of the main body 2 is provided with a rotatable side cover 3, and the outer side of the side cover 3 is provided with a rotatable knob 5. The main body 2 is internally provided with an inner torsion spring seat 6, a first torsion spring 61 and a second torsion spring 71 are arranged between the inner torsion spring seat 6 and the side cover 3, and inner ends of the first torsion spring 61 and the second torsion spring 71 are fixed on the inner torsion spring seat 6. The inner side of the side cover 3 is provided with a first outer torsion spring seat 71 and a second outer torsion spring seat 72 which are rotatable, an outer end of the first torsion spring 61 is fixed on the first outer torsion spring seat 71, and an outer end of the second torsion spring 62 is fixed on the second outer torsion spring seat 72. The side cover 3 is provided with a first substrate component 81 and a second substrate component 82. The first substrate component 81 is provided with a first locating piece 812 for locating the first outer torsion spring seat 71. The second substrate component 82 is provided with a second locating piece 822 for locating the second outer torsion spring seat 72. The first outer torsion spring seat 71 and the second outer torsion spring seat 72 synchronously rotate along with the side cover 3 when the first outer torsion spring seat 71 and the second outer torsion spring seat 72 are located. The knob 5 is provided with an executive part. When the knob 5 rotates, the executive part can drive the first locating piece 812 and/or the second locating piece 822 to move and release the location, so that the first outer torsion spring seat 71 and/or the second outer torsion spring seat 72 can be reset under the elastic force of the corresponding torsion spring.

In this application, the center of the inner torsion spring seat 6 is provided with a central column 66 towards the direction of the side cover 3. The second outer torsion spring seat 72 sleeves the central column 66 and rotates. The first outer torsion spring seat 71 sleeves an outer ring of the second outer torsion spring seat 72 and can rotate. The whole assembly structure is compact and stable.

Specifically, in this application, the first locating piece 812 is a locating pin arranged in the first substrate component 81, the locating pin abuts against a first spring 813 in the first substrate component 81, and the first spring 813 is used for providing elastic force. A first deflector rod 811 extends from the first locating piece 812, and the executive part can move the first deflector rod 811 to move the first locating piece 812 to release the location of the first outer torsion spring seat 71. The second locating piece 822 is a locating pin arranged in the second substrate component 82, the locating pin abuts against a second spring 823 in the second substrate component 82, and the second spring 823 is used for providing elastic force. A second deflector rod 821 extends from the second locating piece 822, and the executive part can move the second deflector rod 821 to move the second locating piece 822 to release the location of the second outer torsion spring seat 72.

From attached figures, it is observed that in the specific structure, a locating hole 711 is formed in the first outer torsion spring seat 71, and the first locating piece 812 is inserted into the first locating hole 711 for realizing location. A second locating hole 721 is formed in the second outer torsion spring seat 72, and the second locating piece 822 is inserted into the second locating piece 822 for realizing location. The structure is compact, and is convenient to locate and unlock. A first outer torsion spring fixing groove 713 is formed in the first outer torsion spring seat 71 for fixing one end of the first torsion spring 61. A second outer torsion spring fixing groove 723 is formed in the second outer torsion spring seat 72 for fixing one end of the second torsion spring 62.

In this application, the executive parts are a first protruding part 51 and a second protruding part 52 which are arranged on the inner side of the knob 5. During the rotation of the knob 5, the first protruding part 51 can guide the first deflector rod 811 to move and the first locating piece 812 can release the location of the first outer torsion spring seat 71, and the second protruding part 52 can guide the second deflector rod 821 to move and the second locating piece 822 can release the location of the second outer torsion spring seat 72. The structure is simple, and the operation is convenient.

Figure 7:
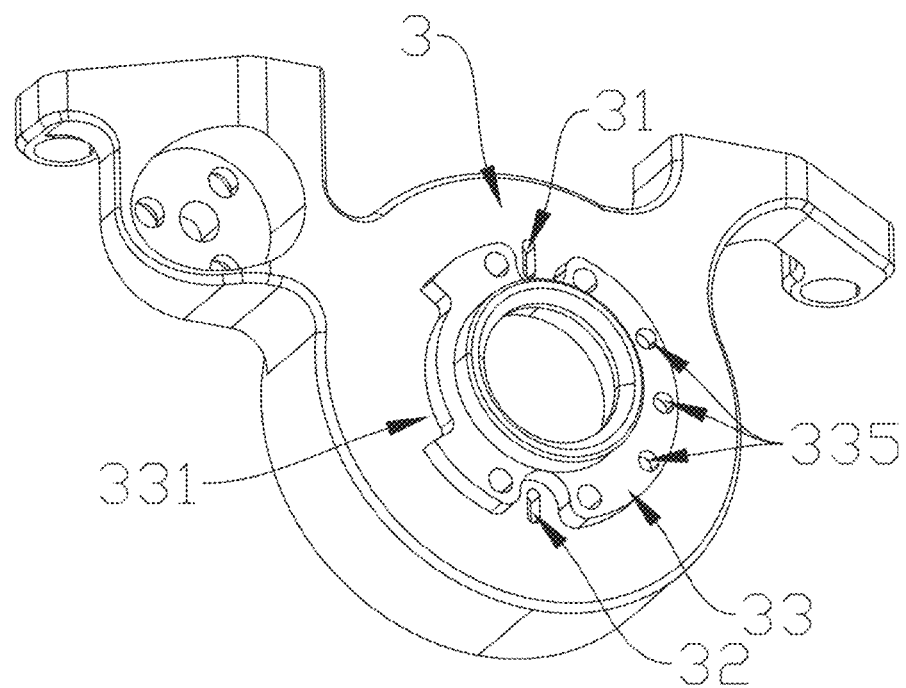
FIG. 7 is a first space diagram of a side cover in a tripod head in this application.
Figure 8:
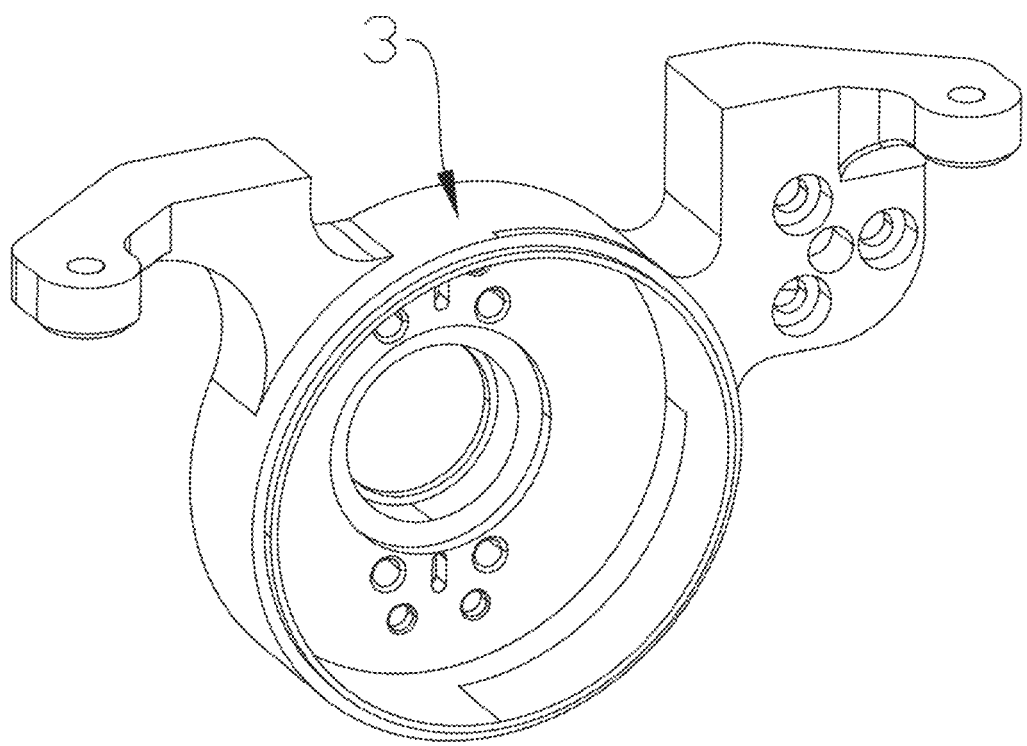
FIG. 8 is a second space diagram of a side cover in a tripod head in this application.
Figure 9:
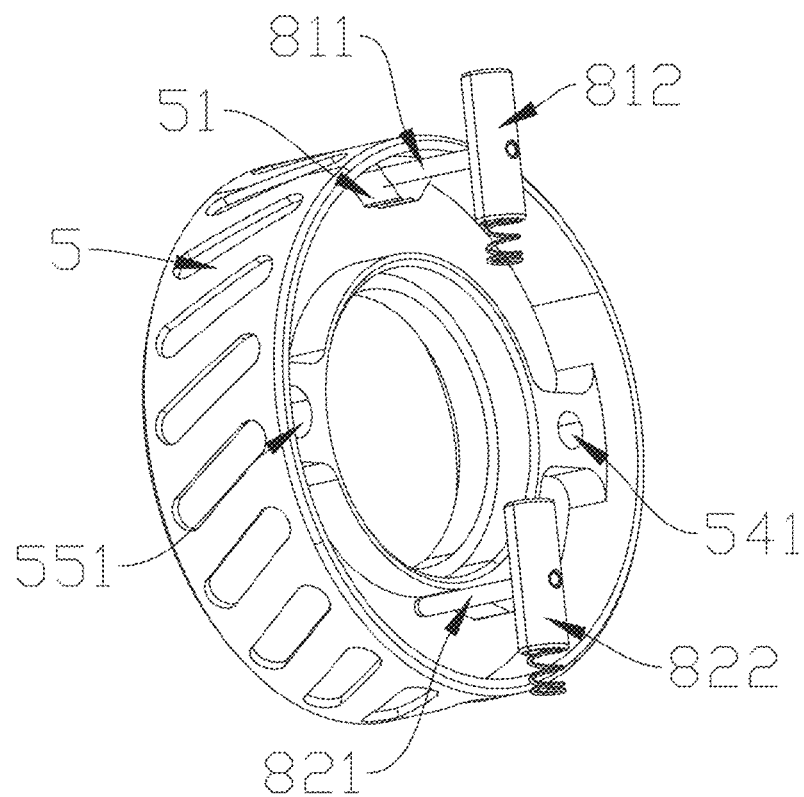
FIG. 9 is a space diagram of a knob and a locating piece in a tripod head in this application.

Moreover, from FIG. 7, it can be observed that in this application, a first strip-shaped hole 31 for the first deflector rod 811 to pass through and a second strip-shaped hole 32 for the second deflector rod 821 to pass through are formed in the side cover 3 to play limiting and guiding roles without influencing the movement of the deflector rod during locating and unlocking. Correspondingly, corresponding strip-shaped holes are also formed in the first substrate component 81 and the second substrate component 82 for the corresponding deflector rods to pass through and move.

From FIG. 7, it can also be observed that one side, facing the knob 5, of the side cover 3 is provided with a protruding structure 33. A limiting groove 331 is formed in the protruding structure 33. The inner side of the knob 5 is provided with a limiting column 54. The limiting column 54 is placed in the limiting groove 331 for limiting movement, and the rotation angle of the knob 5 is also limited, so that excessive rotation is avoided. A gear hole 335 is also formed in the protruding structure 33. The inner side of the knob 5 is provided with a gear ball 55. The gear ball 55 is placed in the gear hole 335 for realizing gear feedback. In the structure, the number of the gear holes 335 can be three. During the rotation of the knob, the gear ball 55 can be separated from one gear hole 335 after the gear ball 55 is stressed and moves into another gear hole 335 to provide gear shifting feedback, and the hand feeling is good.

Figure 10:
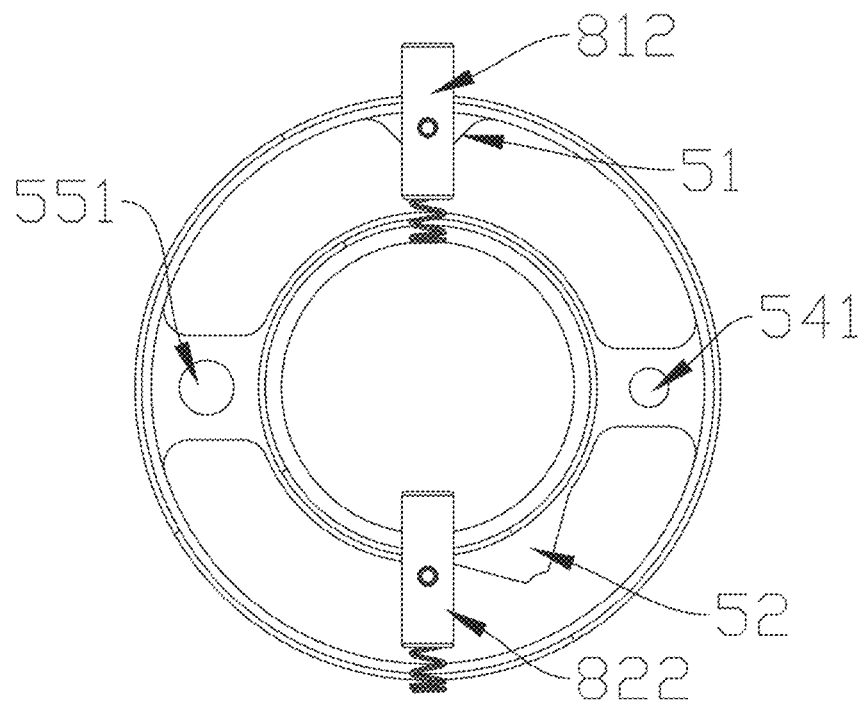
FIG. 10 is a schematic diagram of a knob and a locating piece in a tripod head in this application.

From FIG. 10, it can be observed that a limiting column inserted hole 541 is formed in one side of the knob 5. The limiting column 54 is inserted into the limiting column inserted hole 541. A gear ball assembly hole 551 is formed in the other side of the knob 5. The gear ball 55 is arranged in the gear ball assembly hole 551, and a spring can be arranged for providing elastic force according to needs. In this application, when the tripod head is at the initial position, the first substrate component 81 and the second substrate component 82 are located at the upper end and the lower end of the side cover 3. The first protruding part 51 and the second protruding part 52 on the inner side of the knob 5 are arranged at asymmetric positions on the circumference. Therefore, during the rotation, the first outer torsion spring seat 71 and the second outer torsion spring seat 72 can be unlocked in sequence to realize gear adjustment on the elastic force, so that dynamic balance adjustment is realized.

Figure 11:
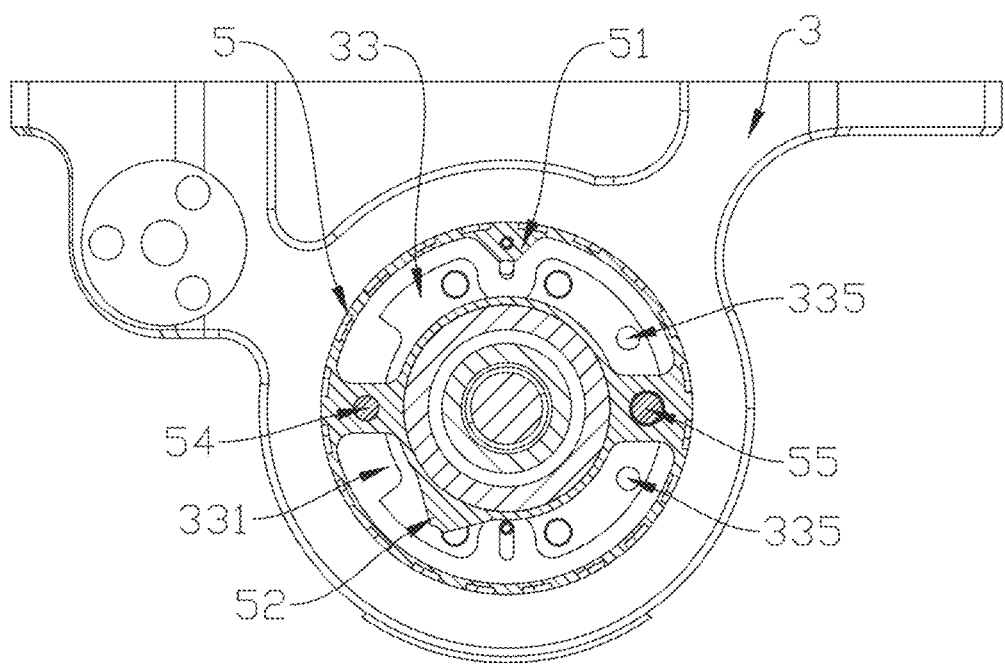
FIG. 11 is a section view at the position when the knob rotates in a tripod head in this application.

From FIG. 11, it can be observed that, in the initial state of the tripod head in this application, the panel 4 faces upwards, the side cover 3 is straightened. At this time, the first torsion spring 61 and the second torsion spring 62 are also in the initial state and are not stressed. During the use, a photographic device is installed on the panel 4, and the panel 4 is rotated to communicate with the side cover 3, so that the tilt angle can be adjusted. During the rotation, the two torsion springs are stressed to generate elastic force to counteract the gravity of the photographic device in an inclined state, so that dynamic balance can be achieved. In this application, the downward gravity generated by different use states and different photographic devices is different, thus in this application, two torsion springs with adjustable gears are adopted. Specifically, in the use process, the knob 5 can be rotated in an inclined state. During the rotation process of the knob 5, the executive part on the knob 5 can drive a locating piece to move, so that the first substrate component 81 or the second substrate component 82 releases the location of the corresponding outer torsion spring seat. At this time, the corresponding outer torsion spring seat can freely rotate and return to the initial state under the elastic force of the corresponding torsion spring. At this time, only the other torsion spring generates elastic force, and relatively small elastic force can be provided to adapt to the use conditions, so that the purpose of dynamic balance adjustment is achieved. In this state, if the knob 5 is rotated continuously, the other locating piece can be moved to release the location of the other outer torsion spring seat. At this time, both torsion springs are not stressed, and the panel 4 can be flexibly rotated to the initial position for resetting. When resetting, the first locating piece 812 and the second locating piece 822 are re-inserted into the corresponding outer torsion spring seats for location to get ready for the next adjustment.

According to the provided dynamic balance adjusting structure used for a tripod head, through the unique structure with double torsion springs, the gear can be selected, multi-gear balance force can be provided to achieve a better dynamic balance effect, and the operation is convenient.

The scope of protection in the present disclosure includes but is not limited to the above-mentioned embodiments. The scope of protection in the present disclosure is subject to the claims, and any substitution, deformation and improvement easily thought of by those skilled in the art fall within the scope of protection in the present disclosure.

The invention claimed is:

1. A dynamic balance adjusting structure used for a tripod head, wherein the dynamic balance adjusting structure comprises a main body (2) arranged on a tripod head, one side of the main body (2) is provided with a rotatable side cover (3), and the outer side of the side cover (3) is provided with a rotatable knob (5);

the main body (2) is internally provided with an inner torsion spring seat (6), a first torsion spring (61) and a second torsion spring (62) are arranged between the inner torsion spring seat (6) and the side cover (3), and inner ends of the first torsion spring (61) and the second torsion spring (62) are fixed on the inner torsion spring seat (6);

the inner side of the side cover (3) is provided with a first outer torsion spring seat (71) and a second outer torsion spring seat (72) which are rotatable, an outer end of the first torsion spring (61) is fixed on the first outer torsion spring seat (71), and an outer end of the second torsion spring (62) is fixed on the second outer torsion spring seat (72);

the side cover (3) is provided with a first substrate component (81) and a second substrate component (82), the first substrate component (81) is provided with a first locating piece (812) for locating the first outer torsion spring seat (71), the second substrate component (82) is provided with a second locating piece (822) for locating the second outer torsion spring seat (72), and the first outer torsion spring seat (71) and the second outer torsion spring seat (72) synchronously rotate along with the side cover (3) when the first outer torsion spring seat (71) and the second outer torsion spring seat (72) are located;

the knob (5) is provided with an executive part, and when the knob (5) rotates, the executive part can drive the first locating piece (812) and/or the second locating piece (822) to move and release the location, so that the first outer torsion spring seat (71) and/or the second outer torsion spring seat (72) can be reset under the elastic force of the corresponding torsion spring.

2. The dynamic balance adjusting structure used for a tripod head according to claim 1, wherein the first locating piece (812) is a locating pin arranged in the first substrate component (81), and the locating pin abuts against a first spring (813) in the first substrate component (81); a first deflector rod (811) extends from the first locating piece (812), and the executive part can move the first deflector rod (811) to move the first locating piece (812) to release the location of the first outer torsion spring seat (71).

3. The dynamic balance adjusting structure used for a tripod head according to claim 2, wherein the second locating piece (822) is a locating pin arranged in the second substrate component (82), and the locating pin abuts against a second spring (823) in the second substrate component (82); a second deflector rod (821) extends from the second locating piece (822), and the executive part can move the second deflector rod (821) to move the second locating piece (822) to release the location of the second outer torsion spring seat (72).

4. The dynamic balance adjusting structure used for a tripod head according to claim 3, wherein the executive part comprises a first protruding part (51) and a second protruding part (52) which are arranged on the inner side of the knob (5); during the rotation of the knob (5), the first protruding part (51) can guide the first deflector rod (811) to move and the first locating piece (812) can release the location of the first outer torsion spring seat (71), and the second protruding part (52) can guide the second deflector rod (821) to move and the second locating piece (822) can release the location of the second outer torsion spring seat (72).

5. The dynamic balance adjusting structure used for a tripod head according to claim 4, wherein a locating hole (711) is formed in the first outer torsion spring seat (71), and the first locating piece (812) is inserted into the first locating hole (711) for realizing location; a second locating hole (721) is formed in the second outer torsion spring seat (72), and the second locating piece (822) is inserted into the second locating piece (822) for realizing location.

6. The dynamic balance adjusting structure used for a tripod head according to claim 3, wherein a first strip-shaped hole (31) for the first deflector rod (811) to pass through and a second strip-shaped hole (32) for the second deflector rod (821) to pass through are formed in the side cover (3).

7. The dynamic balance adjusting structure used for a tripod head according to claim 3, wherein one side, facing the knob (5), of the side cover (3) is provided with a protruding structure (33), a limiting groove (331) is formed in the protruding structure (33), the inner side of the knob (5) is provided with a limiting column (54), and the limiting column (54) is placed in the limiting groove (331) for limiting movement.

8. The dynamic balance adjusting structure used for a tripod head according to claim 3, wherein one side, facing the knob (5), of the side cover (3) is provided with a protruding structure (33), a gear hole (335) is formed in the protruding structure (33), the inner side of the knob (5) is provided with a gear ball (55), and the gear ball (55) is placed in the gear hole (335) for realizing gear feedback.

9. The dynamic balance adjusting structure used for a tripod head according to claim 3, wherein when the tripod head is at an initial position, the first substrate component (81) and the second substrate component (82) are located at the upper end and the lower end of the side cover (3); the first protruding part (51) and the second protruding part (52) on the inner side of the knob (5) are arranged at asymmetric positions on the circumference.

10. The dynamic balance adjusting structure used for a tripod head according to claim 1, wherein the center of the inner torsion spring seat (6) is provided with a central column (66) towards the direction of the side cover (3), the second outer torsion spring seat (72) sleeves the central column (66) and rotates, and the first outer torsion spring seat (71) sleeves an outer ring of the second outer torsion spring seat (72) and can rotate.

* * * * *